(12) United States Patent
Kulkarni et al.

(10) Patent No.: US 9,679,318 B1
(45) Date of Patent: Jun. 13, 2017

(54) SYSTEM, METHOD, AND COMPUTER PROGRAM PRODUCT FOR UPDATING BILLING PARAMETERS UTILIZING A BILL REPLICA

(75) Inventors: Shantanu Vilas Kulkarni, Vadodara (IN); Irina Andreea Diaconu, Galati (RO); Michal Gaszak, Bydgoszez (PL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 1295 days.

(21) Appl. No.: 11/753,515

(22) Filed: May 24, 2007

(51) Int. Cl.
| | |
|---|---|
| *G07F 19/00* | (2006.01) |
| *H04M 15/00* | (2006.01) |
| *G06Q 10/00* | (2012.01) |
| *G06Q 50/00* | (2012.01) |
| *G06Q 30/04* | (2012.01) |
| *G06Q 20/10* | (2012.01) |
| *G06Q 40/00* | (2012.01) |
| *G06Q 40/02* | (2012.01) |
| *G06Q 50/22* | (2012.01) |
| *G06Q 50/24* | (2012.01) |
| *G06Q 40/08* | (2012.01) |
| *G06Q 10/10* | (2012.01) |

(52) U.S. Cl.
CPC .............. *G06Q 30/04* (2013.01); *G06Q 10/10* (2013.01); *G06Q 20/102* (2013.01); *G06Q 40/00* (2013.01); *G06Q 40/02* (2013.01); *G06Q 40/08* (2013.01); *G06Q 40/10* (2013.01); *G06Q 50/22* (2013.01); *G06Q 50/24* (2013.01)

(58) Field of Classification Search
CPC ...... G06Q 30/04; G06Q 20/102; G06Q 40/10; G06Q 40/02; G06Q 40/00; G06Q 50/22; G06Q 50/24; G06Q 40/08; G06Q 10/10

USPC ........................................................ 705/34, 2
See application file for complete search history.

(56) References Cited

U.S. PATENT DOCUMENTS

| | | | | |
|---|---|---|---|---|
| 5,893,129 A | * | 4/1999 | Pollard | 715/222 |
| 5,893,902 A | * | 4/1999 | Transue et al. | 704/275 |
| 5,899,981 A | * | 5/1999 | Taylor et al. | 705/30 |
| 5,951,052 A | * | 9/1999 | Hansen et al. | 283/67 |
| 5,982,864 A | * | 11/1999 | Jagadish et al. | 379/120 |
| 6,035,285 A | * | 3/2000 | Schlect et al. | 705/30 |
| 6,067,554 A | * | 5/2000 | Hohensee et al. | 715/209 |
| 6,125,354 A | * | 9/2000 | MacFarlane et al. | 705/34 |
| 6,226,366 B1 | * | 5/2001 | Bala et al. | 379/114.23 |
| 6,249,571 B1 | * | 6/2001 | Rojas | 379/112.01 |

(Continued)

FOREIGN PATENT DOCUMENTS

| | | | | |
|---|---|---|---|---|
| WO | WO 03/096250 | | 11/2003 | G06F 17/60 |

OTHER PUBLICATIONS

Data Standard: At the intersection of sites by McCourt Brian; Drug Information Journal 41.3 (2007): pp. 393-404.*

(Continued)

*Primary Examiner* — Peter L Ludwig
(74) *Attorney, Agent, or Firm* — Zilka-Kotab, PC (57) ABSTRACT

A system, method, and computer program product are provided for updating a bill. In use, a replica of a bill is displayed. In addition, a selection of al least one parameter of the bill is received. In response to the selection, a user (e.g. a customer representative, etc.) is permitted to enter an updated value for the parameter. Further, the parameter of the bill is updated in the consequent billing cycle to reflect the updated value.

13 Claims, 6 Drawing Sheets

(56) References Cited

U.S. PATENT DOCUMENTS

| | | | |
|---|---|---|---|
| 6,437,807 B1* | 8/2002 | Berquist et al. | 715/764 |
| 6,684,188 B1* | 1/2004 | Mitchell et al. | 705/3 |
| 6,856,986 B1* | 2/2005 | Rossides | |
| 7,054,837 B2* | 5/2006 | Hoffman et al. | 705/28 |
| 7,058,596 B1* | 6/2006 | Wojcik et al. | 705/26.81 |
| 7,124,101 B1* | 10/2006 | Mikurak | 705/35 |
| 7,194,433 B1* | 3/2007 | Hyakutake et al. | 705/34 |
| 7,321,886 B2* | 1/2008 | Swaminathan et al. | 706/60 |
| 7,620,496 B2* | 11/2009 | Rasmussen | 701/455 |
| 7,930,225 B2* | 4/2011 | Wahlberg et al. | 705/30 |
| 8,108,274 B2* | 1/2012 | Johnston et al. | 705/34 |
| 2002/0004729 A1* | 1/2002 | Zak et al. | 705/3 |
| 2002/0004778 A1* | 1/2002 | Torii | 705/38 |
| 2002/0161601 A1* | 10/2002 | Nauer et al. | 705/1 |
| 2002/0188480 A1* | 12/2002 | Liebeskind et al. | 705/4 |
| 2002/0194095 A1* | 12/2002 | Koren | 705/35 |
| 2003/0004874 A1 | 1/2003 | Ludwig et al. | 705/40 |
| 2003/0195844 A1* | 10/2003 | Hogan | 705/40 |
| 2003/0225690 A1* | 12/2003 | Eaton | 705/40 |
| 2004/0088245 A1* | 5/2004 | Narayan et al. | 705/38 |
| 2004/0172306 A1* | 9/2004 | Wohl et al. | 705/3 |
| 2004/0243524 A1* | 12/2004 | Crichlow | 705/412 |
| 2005/0010088 A1* | 1/2005 | Iliff | 600/300 |
| 2005/0010438 A1* | 1/2005 | York et al. | 705/2 |
| 2005/0027172 A1* | 2/2005 | Benavides et al. | 600/300 |
| 2005/0091135 A1* | 4/2005 | Britton | 705/35 |
| 2005/0187872 A1* | 8/2005 | Schmidt et al. | 705/40 |
| 2005/0246274 A1 | 11/2005 | Abbott et al. | 705/40 |
| 2006/0026103 A1* | 2/2006 | Lee | 705/51 |
| 2006/0057079 A1* | 3/2006 | Pickover | 424/50 |
| 2006/0059074 A1* | 3/2006 | Freund | 705/35 |
| 2006/0064313 A1* | 3/2006 | Steinbarth et al. | 705/1 |
| 2006/0075396 A1* | 4/2006 | Surasinghe | 717/168 |
| 2006/0101022 A1* | 5/2006 | Yu et al. | 707/10 |
| 2006/0167662 A1* | 7/2006 | Yu et al. | 702/186 |
| 2006/0259427 A1* | 11/2006 | Randell et al. | 705/40 |
| 2007/0088640 A1* | 4/2007 | Hyakutake et al. | 705/34 |
| 2007/0094103 A1* | 4/2007 | Hyakutake et al. | 705/28 |
| 2007/0203760 A1* | 8/2007 | Schmidt et al. | 705/4 |
| 2007/0265860 A1* | 11/2007 | Herrmann et al. | 705/1 |
| 2008/0010191 A1* | 1/2008 | Rackley, III et al. | 705/39 |
| 2008/0057904 A1* | 3/2008 | Pousti | 455/406 |
| 2008/0160955 A1* | 7/2008 | Giesecke | 455/406 |
| 2009/0090768 A1* | 4/2009 | Silverbrook et al. | 235/375 |
| 2010/0005012 A1* | 1/2010 | Wahlberg et al. | 705/30 |

OTHER PUBLICATIONS

The T & B Show by Knaster Barry Accounting Technology 23.4 (May 2007): 31-32, 34-36.*

"Step-By-Step Guide to Cost Effectively Deploying Intelligent PDF Forms with Adobe Reader Extentions" FormRouter Inc., www.formrouter.com.

* cited by examiner

SYSTEM, METHOD, AND COMPUTER PROGRAM PRODUCT FOR UPDATING BILLING PARAMETERS UTILIZING A BILL REPLICA

FIELD OF THE INVENTION

The present invention relates to billing systems, and more particularly to updating billing parameters

BACKGROUND

Various prior art billing systems provide a mechanism to send bills to Customers. In some instances, there is a need to update billing information that goes on a bill. For example, a customer may object to a charge, etc. over the phone with a customer representative, and any modified information may appear on a next bill in a consequent billing cycle. To date, such prior art billing systems have provided a very simplistic representation of the contents of the bill, for allowing such update. However, such representation typically differs significantly from the bill that the customer received, making communication between customer and customer representative difficult.

There is thus a need for addressing these and/or other issues associated with the prior art.

A system, method, and computer program product are provided for updating a Bill. In use, a replica of a bill is displayed. In addition, a selection of at least one parameter of the bill is received. In response to the selection, a user (e.g. a customer representative, etc.) is permitted to enter an updated value for the parameter. Further, the parameter of the bill is updated to reflect the updated value.

DETAILED DESCRIPTION

Figure 1:
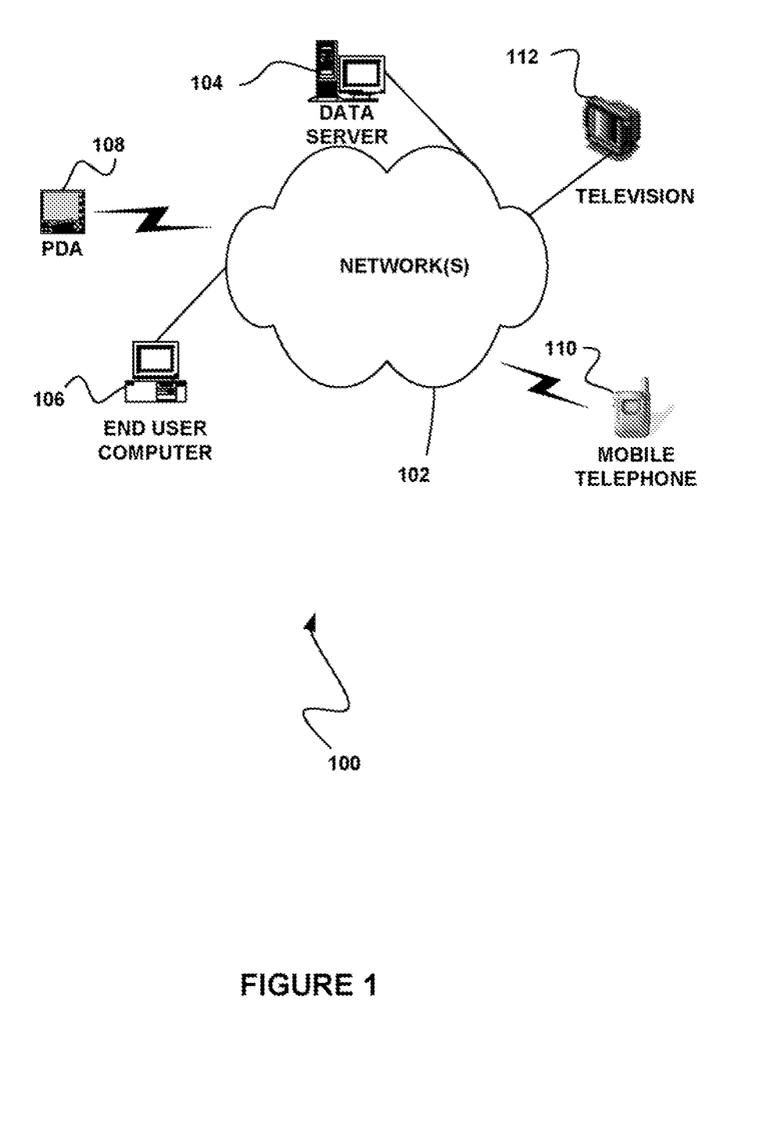
FIG. 1 illustrates a network architecture, in accordance with one embodiment.

FIG. 1 illustrates a network architecture 100, in accordance with one possible embodiment. As shown, at least one network 102 is provided. In the context of the present network architecture 100, the network 102 may lake any form including, but not limited to, a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
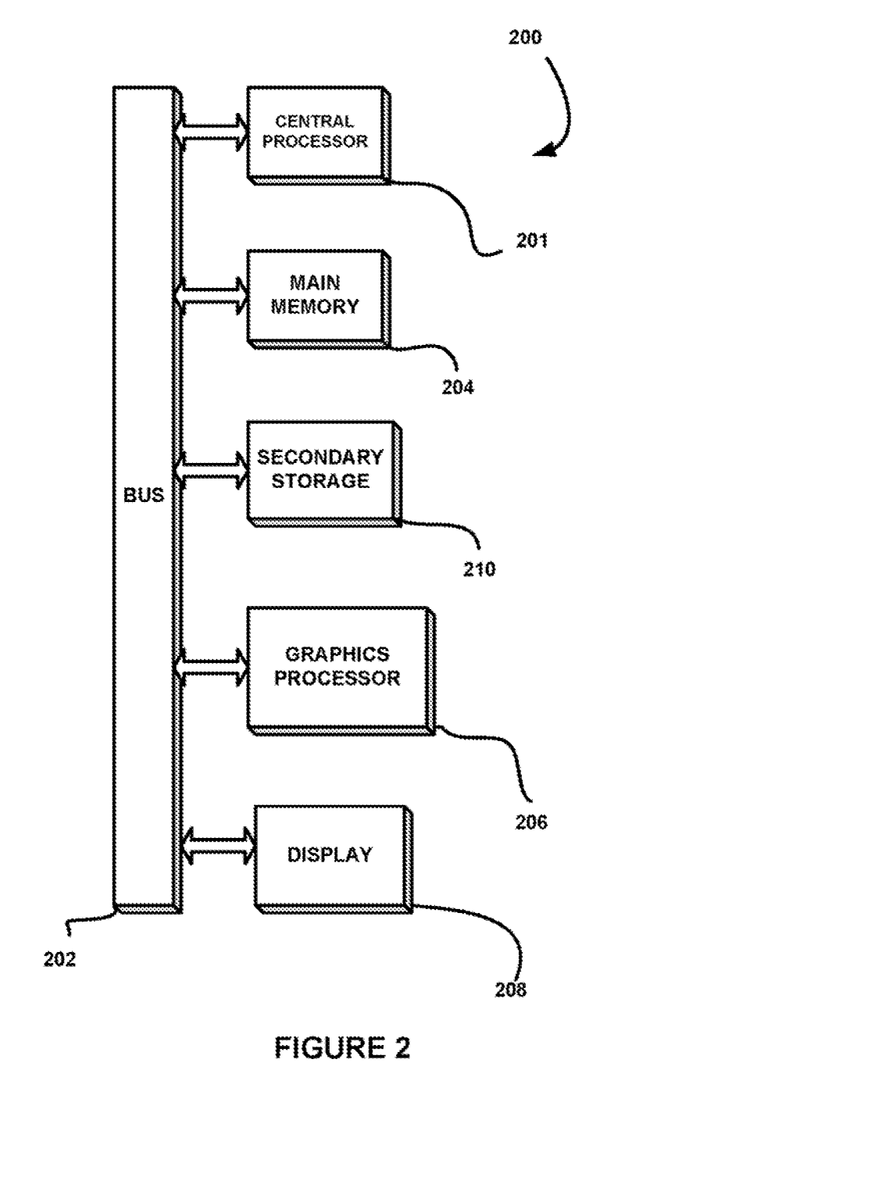
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.] The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Figure 3:
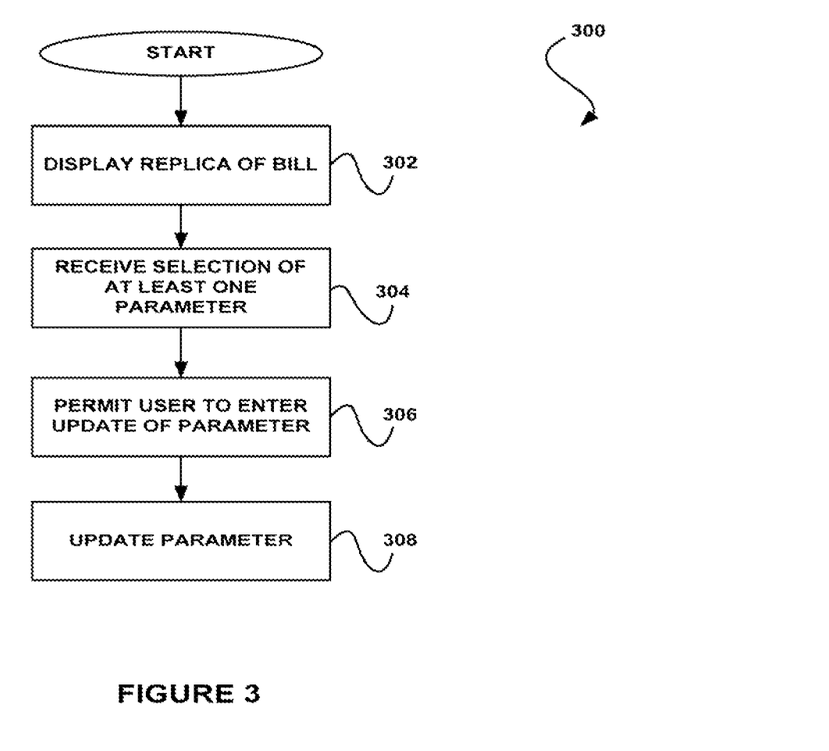
FIG. 3 shows a method for updating at least one bill parameter, in accordance with one embodiment.

Computer programs, or computer control logic algorithms, may be stored in the main memory 204 and/or the secondary storage 210. Such computer programs, when executed, enable the system 200 to perform various functions. Memory 204, storage 210 and/or any other storage are possible examples of computer-readable media FIG. 3 shows a method 300 for updating at least one bill parameter, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

In the context of the present description, a bill refers to any document relating to a transaction. For example, in various embodiments, a bill may include, but is not limited to a service bill, a bill for a good, an invoice, a bank statement, and/or any other document that meets the above definition. In various embodiments, the bill may include any paper or electronic document. For example, the bill may include, but is not limited to an electronic billing statement, a paper copy of a bill, an original bill, an electric copy of a bill, etc.

As shown in operation 302, a replica of a bill is displayed. Such replica may be displayed on any type of device. For example, the bill replica may be displayed using any one of the devices shown in FIG. 1. Additionally, the replica may be displayed utilizing a system such as that shown in FIG. 2, for example. Furthermore, it should be noted that the replica of the bill corresponds to another bill. For example, in one embodiment, the replica of the bill may be an exact or close copy of another bill in the possession of a third party (e.g. a customer, etc.).

Additionally, as shown in operation 304, a selection is received of at least one parameter of the bill. Again, such selection may be received utilizing any number of devices in a variety of ways. For instance, the selection may be received via an input device (e.g. keyboard, keypad, mouse, etc.) of any one of the devices shown in FIGS. 1-2, and possibly utilizing a network such as that described in FIG. 1.

In the context of the present description, a bill parameter refers to any parameter, field, etc. in a bill. For example, in various embodiments, a bill parameter may include, but is not limited to an amount, a time, a date, a location, information relating to a good and/or service, and/or any other parameter that meets the above definition.

Further, in operation 306, a user (e.g. a customer representative, etc.) is permitted to enter an updated value for the selected parameters). The user may enter the updated value in a variety of ways. For instance, in one embodiment, the user may enter the updated value by selecting from a plurality of possible updated values in a drop-down menu or any other type of interface, for that matter. Additionally, in another embodiment, the user may manually type the updated value via a user interface. However, it is important to note that these are only examples and the user may update the selected parameter(s) utilizing any number of devices (e.g. a customer representative may use his/her computer to update the database, etc.). Further, in the context of the present description, the value may include any alphanumeric character, word, phrase, symbol, etc.

After the user has entered the updated value, the selected parameter(s) is then updated to reflect the updated value, as shown in operation 308. In one embodiment, the selected parameter(s) may be updated in a database, for example. Of course, updating the parameter(s) may be accomplished in a variety of ways and should not be limited to the aforementioned examples.

In one embodiment, one or more parameters on the bill may be selected via PDF links. The replica, in such embodiment, may itself be a PDF document and the parameters that accept modifications (e.g. with respect to charges, taxes, offer codes, etc.) may point to a web application that is capable of accessing a billing database and update appropriate fields (e.g. charges, totals, etc.). In one embodiment, the aforementioned PDF links may use an HTTP protocol by default.

In one example of use, the replica of the bill may be displayed using a customer representative's computer, when the customer who received the bill calls. In one possible embodiment, only replicas of certain pages may be accessed (e.g. the customer may complain about ten charges presented on pages 4 and 5 of the bill, such that the customer representative only requests replicas of those pages, etc.). For security purposes, the customer may not have direct access to the associated billing database. Additional information regarding such exemplary details will be set forth later in greater detail during the description of subsequent figures.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
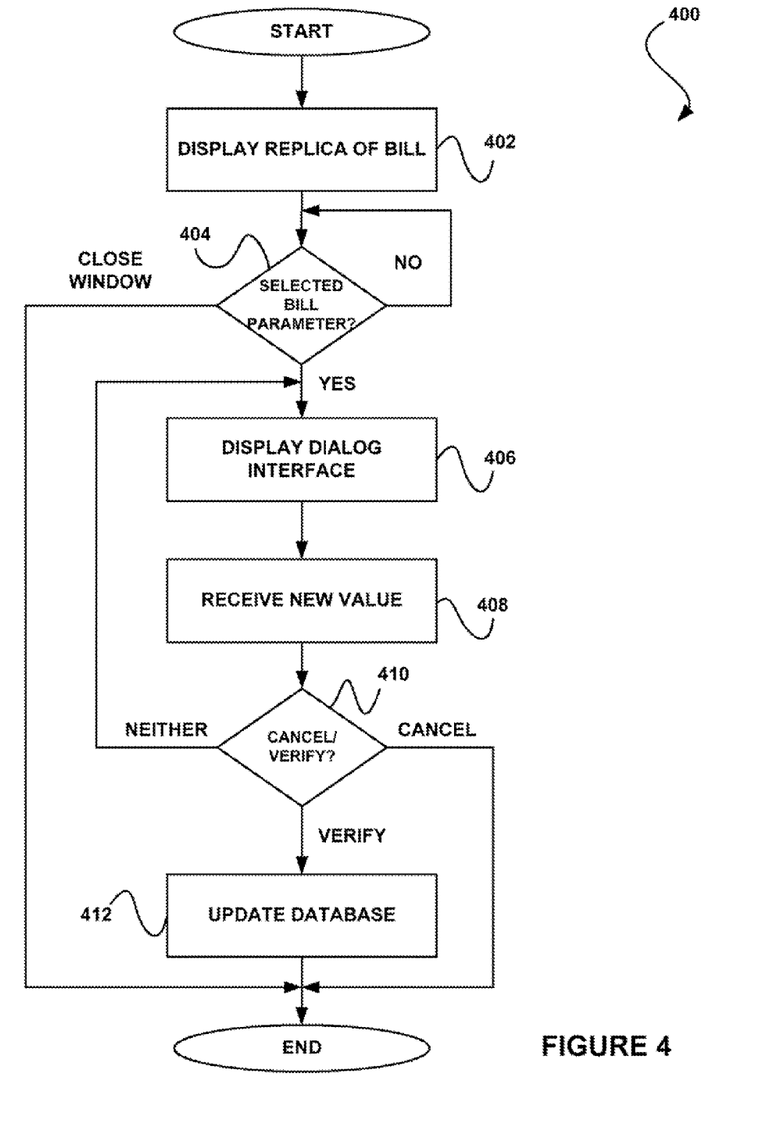
FIG. 4 shows a method for updating at least one bill parameter, in accordance with another embodiment.

FIG. 4 shows a method 400 for updating at least one bill parameter, in accordance with another embodiment. As an option, the method 400 may be implemented in the context of the details of FIGS. 1-3. Of course, however, the method 400 may be earned out in any desired environment. Further, the aforementioned definitions may equally apply to the description below.

As shown in operation 402, a replica of a bill is displayed, in response to a customer call, etc. Such replica may be displayed on any device, such as one of the devices shown in FIG. 1, for example. Additionally, the replica of the bill may be received in a variety of ways. For instance, the replica may be received from a remote database over a network such as that described in FIG. 1. Additionally, the replica may be received utilizing a system such as that shown in FIG. 2, utilizing a local database, for example. In various embodiments, the replica of the bill may be produced from a billing database, bill archiving system, etc.

It should be noted that the replica of the bill may, in one embodiment, be a minor image of another bill which may be possessed by a third party. For example, the replica of the bill may be an exact copy of a bill sent to a customer via a network (e.g. an electronic bill). Furthermore, the replica of the bill may be an exact copy of a paper bill sent to a customer, in another embodiment. To this end, a user (e.g. customer representative, etc.) may use the replica of the bill to respond to inquiries by the third party more efficiently because the user and the third party are able to essentially view the same bill. It should be noted that, in various embodiments, the user may have certain permissions (e.g. authorizations) to make modifications in a billing database and legal/electronic authorizations to view bills of customers who contact him/her.

For example, in one embodiment, a customer (e.g. a bill receiver) may call a customer service representative with a question on a billing amount, a request for some additional information, and/or another inquiry regarding a bill. In such case, the customer may be in possession of the original bill or a copy of the original bill (e.g. an electronic bill, or paper bill, etc.) and the customer service representative may make a request, and in turn, receive and view a replica of the customer's bill which the customer has in his/her possession. The customer service representative may then use the replica of the bill to respond to inquiries while both the customer and customer service representative are addressing the same document.

In the context of the present description, a customer refers to any party who has received a bill. For example, in various embodiments, a customer may include, but is not limited to a customer of any service and/or good (e.g. a customer of a telecom service), and/or any other customer that meets the above definition.

Once the replica of the bill is displayed, it is determined if a user has selected a bill parameter, as shown in decision 404. For example, a user may click on any selectable parameter, where such a parameter includes a PDF link that opens a web billing application window. The user can check if the parameter is selectable or not by moving a cursor on top of it. If it is selectable, an "arrow" or "hand" cursor may turn into a pointing hand cursor, for example. If the user has selected a bill parameter, a dialog interface (e.g. a billing application window) is displayed, as shown in operation 406. On the other hand, if the user has not selected a bill parameter per decision 404, the method 400 remains static. Furthermore, the user may choose to exit instead of displaying the dialog interface, in the manner shown.

In one embodiment, the user may desire to view the replica of the bill without making any changes. For instance, during communication with a customer it may be determined that no bill parameter requires a change. In such case, the user may decide to exit the replica display. On the other hand, if it is determined that a parameter(s) on the bill requires a change, the user may select the parameter(s).

Once the parameter(s) has been selected, the dialog interface is displayed, as shown in operation 406. Such dialog interface may be displayed on any desired device, in a variety of different ways. For example, in one embodiment, the dialog interface may be displayed separately from the bill replica. In another embodiment, the dialog interface may be displayed as pan of the replica, or an extension of the replica. In still yet another embodiment, the dialog interface may be an editable version of the bill replica. As an option, the dialog interface may appear with notes, a history, and/or any other information relating to the parameter.

Furthermore, the selection of the parameter(s) may be accomplished in a variety of ways. In one embodiment, the user may select parameters using a mouse by clicking on the parameter. In another embodiment, the user may select a parameter by passing over the parameter with an icon, using a keyboard/keypad, etc. In one specific embodiment, the selection of parameters may be accomplished using PDF interactive features (e.g. links, etc.).

In use, the dialog interface may allow the user to optionally make modifications to the selected parameter(s), by receiving a new value for the parameter, as shown in operation 408. For example, if, during communications between the user and a customer, it is determined that a billing parameter (e.g. a charge amount) should be changed, the user may enter a new updated value into the dialog box which reflects the change to the selected parameter.

In the case where an amount adjustment is required, the user can directly click on the parameter details (e.g. any parameter that needs to be adjusted) on the bill replica. This opens the dialogue interface displaying the concerned amount to be adjusted, for example. The user may then enter a new value (e.g. a new charge, etc.) so that the adjustment to be made is reflected in the next billing cycle, for example.

In one optional embodiment, the dialog interface may show comments and/or other information on the selected parameter(s). For example, in one embodiment, the dialog interface may show information on other changes made to the parameter by other users. In another embodiment, the dialog interface may display a charge history for a specific charge(s) to the customer.

Once the new value of the parameter has been received, the user is then prompted to cancel or verify the new value in operation 410. If the user verifies the new value, a database may be updated to reflect the change, as shown in operation 412. On the other hand, if the change is cancelled, the database may not be updated. In the case where the user does not choose to verify or cancel the new value, the dialog interface continues to be displayed, prompting the user for another value or to verify/cancel the existing value.

It should be noted that the database which is updated to reflect the parameter change may or may not be the same database from which the replica of the bill was received. Furthermore, the database that is updated to reflect the parameter change may be a remote or local database. In one embodiment, only the updated bill parameters are stored in the database. In another embodiment, the original parameter values and the new parameter values may be stored in the database.

To this end, the updated data may be captured during a next billing cycle. As an option, the bill replica may be updated. By default, however, the replica may not be updated, for legal reasons.

It should be noted that, in one embodiment, the replica of the bill may, in one embodiment, be created in Adobe Acrobat® as a portable document format (PDF). Further, any PDF view may be used. In such case, a user application may have an embedded PDF viewer in order to view the PDF bill replica. For example, a customer service manger application and/or a billing manager application may include an embedded PDF viewer in order to display the bill replica to a customer service representative.

The PDF replica may be created in a variety of ways. For example, in one embodiment, the PDF replica may be created using any system, such as the system as shown in FIG. 2. The PDF replica may then be received by an application with the capability to view the PDF replica, such as an application with an embedded PDF viewer.

In another embodiment, the PDF replica may be created on a UNIX machine. The PDF replica may then be received by an application with the capability to view the PDF replica, such as an application with an embedded PDF viewer. For example, in one embodiment, PDF replica may be sent to a customer service manger and/or a billing manager application using Tuxedo or Enterprise Java Beans (EJB) on a network server. It should be noted, however, that the PDF replica may be created utilizing a number of techniques and is nor limited to the forgoing examples. In one possible embodiment, the PDF replica may be created locally on a system such as that shown in FIG. 2. More likely, the PDF replica may be created remotely, such that it is transferred over a network, such as that shown in FIG. 1, for example.

In yet another embodiment, the PDF is created with web link annotation using a customized protocol (e.g. add://). Such web link annotation may be inserted for each parameter. Further, the web link annotation may include an identifier that uniquely identities a corresponding parameter record in a database. Such customized protocol may, in one embodiment, need to be registered on a user's PC. In use, a free PDF viewer application (with interactive capabilities) may be used to access the PDF.

For example, each charge record and/or any other billing parameter for which an amount adjustment or a database lookup is desired may have a web link annotation. As an option, each bill parameter may appear hyperlinked when viewed in the PDF replica. Thus, each parameter in the replica may include a corresponding link to a database, for example. This provides the user with an interactive PDF replica of the bill, with each billing parameter capable of being updated utilizing the corresponding link.

Utilizing the hyperlinked parameters, the user (e.g. a customer service representative, etc.) may use the replica to look up an old parameter (e.g. an old charge, etc.) from the database and load the parameter in the dialogue interface. The user may then enter a new value (e.g. a new charge, etc.) in the dialog interface and, in turn, save the new value to the database for the next billing cycle, for example. Thus, the hyperlinked parameters may be used to update the database utilizing die corresponding link.

In one optional embodiment, the user may not necessarily be able to select other parameters, unless a verify or cancel button is selected on a current dialog interface. In another embodiment, the user may be able to select multiple parameters at different times, without verifying or cancelling previously entered values.

To this end, the present technique for updating a bill parameter enables users to interact with a bill replica such that the user may more effectively relate to a holder of the bill. For example, a service provider's customer service representatives may utilize the replica so that they can more efficiently handle inquiries and/or discrepancies that may arise from a customer in possession of the bill. In such case, having the replica of the bill in question available to a customer service representative provides a more effective tool in addressing specific issues, as both the customer service representative and the customer may both simultaneously view the bill in question. Thus, the customer and the customer service representative may be able to direct questions towards specific portions of the bill (e.g. a particular parameter on a particular page, etc.). Furthermore, such technique allows the customer service representative to adjust or correct an amount in the bill very efficiently in cases of amount disputes, etc.

Figure 5:
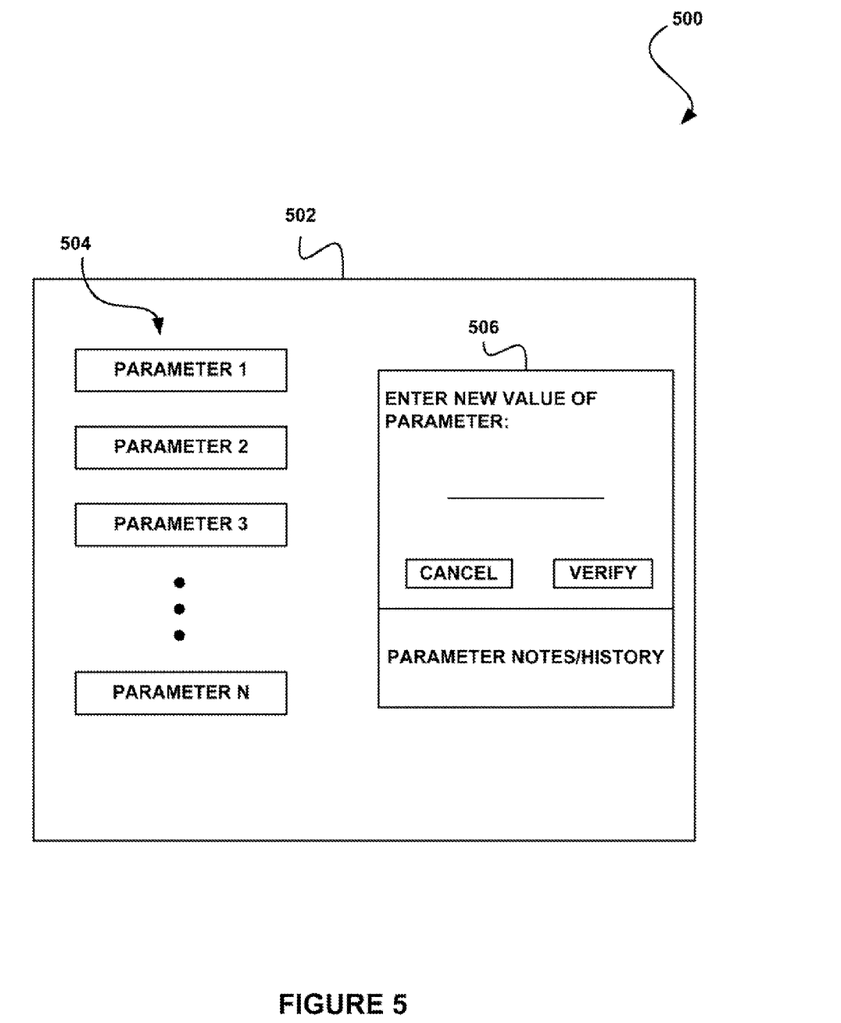
FIG. 5 shows an interface for updating at least one bill parameter, in accordance with one embodiment.

FIG. 5 shows an interface 500 for updating at least one bill parameter, in accordance with one embodiment. As an option, the interface 500 may be implemented in the context of the details of FIGS. 1-4. Of course, however, the interface 500 may be carried out in any desired environment. Further, the aforementioned definitions may equally apply to the description below.

As shown in FIG. 5, the interface 500 displays a replica of a bill 502 with a plurality of parameters 504. It should be noted that the bill replica 502 may be a minor image of another bill. For example, the bill replica 502 may be an itemized telephone bill with a plurality of parameters corresponding to an itemized listing of calls and charges relating to the calls. In this case, the bill replica 502 may be a replica of the original telephone bill a customer may have in their possession. Thus, the parameters 504 may correspond with the parameters corresponding to the itemized listing of calls on the original bill.

Additionally, in one embodiment, a user of the interface 500 may be a customer service representative responding to an inquiry by the customer in possession of the original bill. In use, the user may respond to the inquiry by selecting one or more of the plurality of parameters 504. In such case, a dialog interface 506 may offer the user an opportunity to change the value of the parameter by entering a new value into the dialog interface 506.

In response to an inquiry by the customer, the customer service representative may select one or more of the plurality of parameters 504, and in turn, a history, notes, and/or other information on the parameters) may be displayed in the dialog interface 506 in the manner shown. The customer service representative may utilize the information on the parameters), which is displayed in the dialog interface 506, to help determine whether the parameter should be updated, for example.

Once it is determined whether the parameter(s) should be changed, and the user enters the new value into the dialog interface 506, a database may be updated to reflect the new value once the user verities the same. It should also be noted that the user may verify the new value in a variety of ways, such as selecting a verify button on the dialog interface 506, for example. Of course, the verify button shown on the dialog interface 506 may take on a variety of different forms in other embodiments and is shown in the current location and form for illustrative purposes only. Instead of verifying the new value of the selected parameter, the user may choose to cancel the change utilizing a cancel button in the dialog interface. Similar to the verily button, the cancel button shown on the dialog interface 506 may take on a variety of forms in other embodiments.

In the present embodiment, the dialog interface 506 is shown as a separate interface from the bill replica 502. However, in another embodiment, the dialog interface 506 may be integrated into the parameters 504 upon selection of a parameter. For instance, upon selection of a parameter, the dialog interface 504 may appear in the same position as the selected parameter 504 but as modifiable text. Further, in another embodiment, the dialog interface 506 may be shown as a field of one of the selected parameters which allows updating. Additionally, the dialog interface 506 may be displayed outside of the bill replica 502, in a separate window, for example.

In other embodiments, a dialog interface may be provided for each parameter. For example, in one embodiment when the user passes over a parameter with a mouse, a dialog interface may appear with notes, history, and/or other information relating to the parameter. Additionally, when the user passes over another parameter, another dialog interface may appear with notes, history, and/or other information relating to the other parameter.

Still yet, in another embodiment, the dialog interface may include notes, history, and/or other information relating to a selected parameter, in addition to a separate dialog interface which may be utilized to change a value of a parameter. For example, upon passing over a parameter with the mouse, a dialog interface may appear with notes, history, and/or other information relating to the parameter. However, upon clicking on the parameter with the mouse, a separate dialog interface may appear which allows the user to change the value of the selected parameter.

Figure 6:
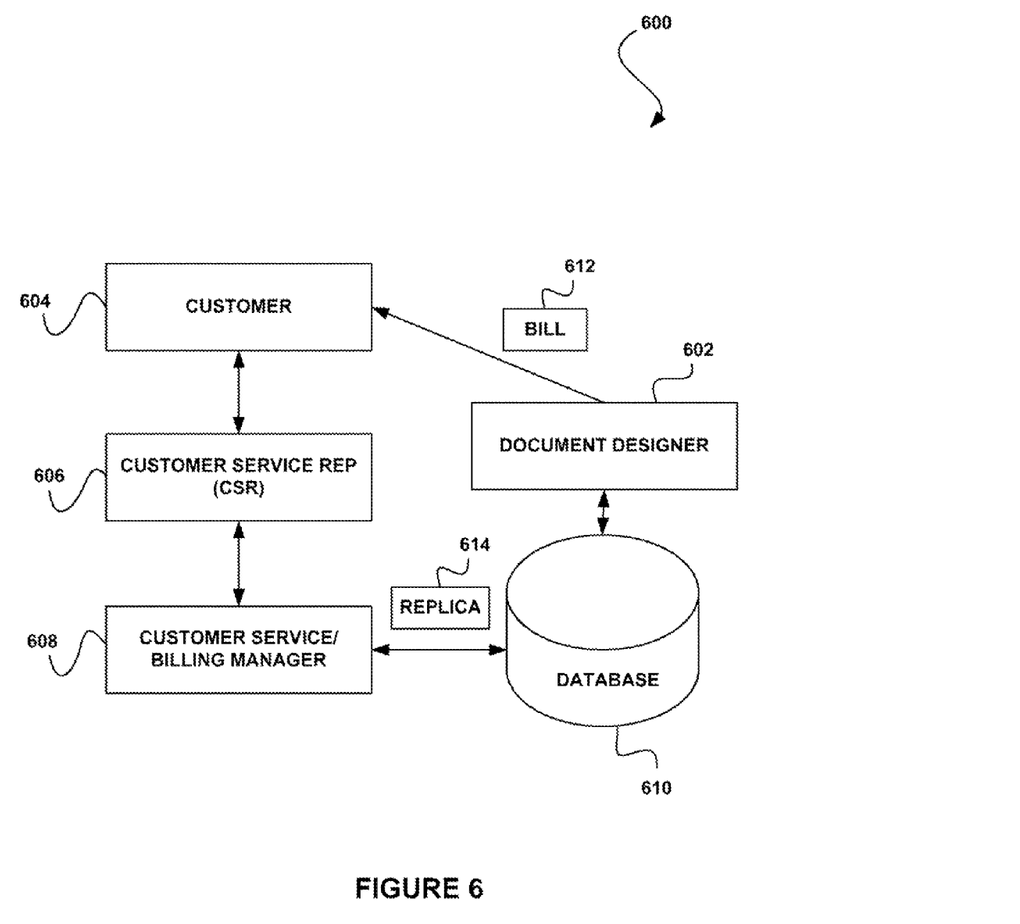
FIG. 6 shows a system for updating at least one bill parameter, in accordance with one embodiment.

FIG. 6 shows a system 600 for updating at least one bill parameter, in accordance with one embodiment. As an option, the system 600 may be implemented in the context of the details of FIGS. 1-5. Of course, however, the system 600 may be used in any desired environment Further, the aforementioned definitions may equally apply to the description below.

As shown in FIG. 6, a document designer 602 is included for providing a bill 612 to be delivered to a customer 604. The bill 612 may be delivered via a network such as that shown in FIG. 1, for example. Thus, the bill 612 may be generated using the document designer 602 and sent to the customer 604 in the form of an electronic bill. In another embodiment, the bill 612 which is generated by the document designer 602 may be a paper bill that is mailed to the customer 604.

Further, the document designer 602 may interface with a database 610 locally or over a network. Additionally, the document designer 602 may utilize the interface to the database 610 to send a replica 614 of the bill 612, which the document designer 602 may have generated. In such case, the database 610 may store the bill replica 614 for use at a later time, or be used to generate the bill replica 614 in real-time when needed.

For example, in one embodiment, the customer 604 may have a question or dispute with a parameter on the bill 612. In such case, the customer 604 may call, email, or otherwise contact a customer service representative (CSR) 606 in order to address the question regarding the bill 612. The CSR 606 may use a customer service/billing manager application 608 to request and, in turn, receive the bill replica 614.

The CSR 606 may then use the customer service/billing manager application 608 to display the bill replica 614. The CSR 606 may use the bill replica 614 to address the customer's questions regarding the bill 612, while viewing the bill replica 614. The CSR 606 may further choose to modify parameters in the bill replica 614 in response to the customer's inquiry In such case, the CSR 606 may use the customer service/billing manager application 608 to change the parameters in the bill replica 614 and, in turn, update the database 610. The document designer 602 may then optionally generate a new bill based on the updates to the bill replica 614 and send the new bill to customer 604 which reflects the changes made to the bill replica 614.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying, by a system including a hardware processor, a bill associated with a customer, the bill having a plurality of parameters;
creating, by the system, a replica of the bill, the replica having the plurality of parameters, the creating including:
identifying, by the system, each of the plurality of parameters in the replica of the bill,
generating, by the system, a web link annotation for each of the identified parameters, the web link annotation for each of the identified parameters uniquely identifying a corresponding parameter record in a database and pointing to a web application for accessing the corresponding parameter record in the database, and
for each of the identified parameters, inserting, by the system, the web link annotation generated for the parameter into the portion of the replica of the bill having the parameter, using a predetermined protocol;
displaying to a user, by the system, the created replica of the bill within a local viewer application;
receiving at the system, from the user, a selection of one of the parameters within the replica of the bill, the one of the parameters including a value thereof;
in response to the selection of the one of the parameters of the replica of the bill;
using, by the system, the web link annotation included in the replica of the bill for the selected one of the parameters to retrieve from the database the value of the selected one of the parameters,
opening, by the system, a window of the web application, separate from the local viewer application, that displays the retrieved value of the selected one of the parameters, at least one note created by at least one other user for the selected one of the parameters, and a history relating to the value of the selected one of the parameters;
receiving, from the user by the system through the window of the web application, an updated value for the selected one of the parameters;
using the web link annotation included in the replica of the bill for the selected one of the parameters, updating, by the system, the parameter record in the database that corresponds to the selected one of the parameters to reflect the updated value.

2. The method of claim 1, wherein the replica of the bill has a portable document format.

3. The method of claim 1, wherein the one of the parameters includes one of a monetary charge, information associated with a good or service, and a date.

4. The method of claim 1, wherein the replica of the bill is a replica of an electronic bill sent to the customer via a network.

5. The method of claim 1, wherein the replica of the bill is a replica of a paper bill sent to the customer.

6. The method of claim 1, wherein the replica of the bill is an exact replica of the bill assocated with the customer.

7. The method of claim 1, wherein the user is a customer service representative.

8. The method of claim 1, wherein once the updated value for the selected one of the parameters has been received from the user, the user is then prompted to cancel or verify the updated value.

9. A non-transitory computer program product embodied on a tangible computer readable medium, comprising computer code for:
identifying, by a system including a hardware processor, a bill associated with a customer, the bill having a plurality of parameters;
creating, by the system, a replica of the bill, the replica having the plurality of parameters, the creating including:
identifying, by the system, each of the plurality of parameters in the replica of the bill,
generating, by the system, a web link annotation for each of the identified parameters, the web link annotation for each of the identified parameters uniquely identifying a corresponding parameter record in a database and pointing to a web application for accessing the corresponding parameter record in the database, and
for each of the identified parameters, inserting, by the system, the web link annotation generated for the parameter into the portion of the replica of the bill having the parameter, using a predetermined protocol;
displaying to a user, by the system, the created replica of the bill within a local viewer application;
receiving at the system, from the user, a selection of one of the parameters within the replica of the bill, the one of the parameters including a value thereof;
in response to the selection of the one of the parameters of the replica of the bill:
using, by the system, the web link annotation included in the replica of the bill for the selected one of the parameters to retrieve from the database the value of the selected one of the parameters,
opening, by the system, a window of the web application, separate from the local viewer application, that displays the retrieved value of the selected one of the parameters, at least one note created by at least one other user for the selected one of the parameters, and a history relating to the value of the selected one of the parameters;
receiving, from the user by the system through the window of the web application, an updated value for the selected one of the parameters;
using the web link annotation included in the replica of the bill for the selected one of the parameters, updating, by the system, the parameter record in the database that corresponds to the selected one of the parameters to reflect the updated value.

10. The non-transitory computer program product of claim 9, wherein the replica of the bill is a replica of an electronic bill sent to the customer via a network.

11. The non-transitory computer program product of claim 9, wherein the replica of the bill is a replica of a paper bill sent to the customer.

12. A system, comprising:
a hardware processor for:
identifying, by the system, a bill associated with a customer, the bill having a plurality of parameters;
creating, by the system, a replica of the bill, the replica having the plurality of parameters, the creating including:
identifying, by the system, each of the plurality of parameters in the replica of the bill,
generating, by the system, a web link annotation for each of the identified parameters, the web link annotation for each of the identified parameters uniquely identifying a corresponding parameter record in a database and pointing to a web application for accessing the corresponding parameter record in the database, and for each of the identified parameters, inserting, by the system, the web link annotation generated for the parameter into the portion of the replica of the bill having the parameter, using a predetermined protocol;

displaying to a user, by the system, the created replica of the bill within a local viewer application;

receiving at the system, from the user, a selection of one of the parameters within the replica of the bill, the one of the parameters including a value thereof;

in response to the selection of the one of the parameters of the replica of the bill:

using, by the system, the web link annotation included in the replica of the bill for the selected one of the parameters to retrieve from the database the value of the selected one of the parameters, opening, by the system, a window of the web application, separate from the local viewer application, that displays the retrieved value of the selected one of the parameters, at least one note created by at least one other user for the selected one of the parameters, and a history relating to the value of the selected one of the parameters;

receiving, from the user by the system through the window of the web application, an updated value for the selected one of the parameters;

using the web link annotation included in the replica of the bill for the selected one of the parameters, updating, by the system, the parameter record in the database that corresponds to the selected one of the parameters to reflect the updated value.

13. The system of claim 12, wherein the database is in communication with a manager application via a network.

\* \* \* \* \*